United States Patent [19]
Ettischer

[11] 3,878,548
[45] Apr. 15, 1975

[54] CAMERA WITH DETECTION MEANS

[75] Inventor: Helmut Ettischer, Stuttgart, Germany

[73] Assignee: Eastman Kodak Company, Rochester, N.Y.

[22] Filed: Nov. 19, 1973

[21] Appl. No.: 417,178

[30] Foreign Application Priority Data
Dec. 23, 1972 Germany............................ 7247163

[52] U.S. Cl. .................... 354/268; 350/65; 354/219
[51] Int. Cl. ............................................ G03b 19/02
[58] Field of Search .......... 354/268, 266, 202, 288, 354/219, 48, 53, 57, 38; 350/65, 242

[56] References Cited
UNITED STATES PATENTS

| | | | |
|---|---|---|---|
| 3,021,771 | 2/1962 | Kirk | 354/53 X |
| 3,440,939 | 4/1969 | Peterson et al. | 354/268 X |
| 3,481,258 | 12/1969 | Mori et al. | 354/48 X |
| 3,611,896 | 10/1971 | Aoki | 354/202 |
| R21,034 | 3/1939 | Karg | 354/38 |

Primary Examiner—Samuel S. Matthews
Assistant Examiner—Kenneth C. Hutchison
Attorney, Agent, or Firm—R. F. Brothers

[57] ABSTRACT

A camera having a lens cover which, when open, is movable to a lock position blocking the camera's shutter release button. The cover is normally held out of its lock position by a spring, but is positioned adjacent the camera's taking lens so that a finger, inadvertently placed over the lens, will also move the cover to its lock position. A visible indicator may be associated with the lens cover so as to move into the camera's viewfinder if the operator's finger passes in the field of view of a camera's taking lens.

4 Claims, 4 Drawing Figures

PATENTED APR 15 1975　　3,878,548

CAMERA WITH DETECTION MEANS

BACKGROUND OF THE INVENTION

1. Field of the Invention

The present invention relates to cameras, and particularly to a camera having means for preventing an exposure if the operator's finger or other object is resting against the camera and extending into the field of view of the camera's taking lens.

2. Description of the Prior Art

It is known to provide locking devices for cameras' shutter release mechanisms to prevent inadvertent operation of the camera in situations where proper exposure will not be obtained. One such situation might arise in instances where the film has not been advanced after the last picture has been taken, and devices for preventing this are known as "double exposure prevention" devices. In cameras having removable or openable covers for the taking lens, it is known to prevent actuation of the shutter release mechanism when the cover is in place or closed, as the case may be. Other cameras with lens covers may provide for an indication, visible in the viewfinder, when the lens cover is in its closed position. Such a camera mechanism is shown in coassigned Defensive Publication No. T896,020, in the name of David E. Beach and dated Mar. 7, 1972.

While cameras of this type adequately prevent inadvertent shutter release if the camera has not been properly prepared, they do not insure that the operator is holding the camera in such a way that his finger is not protruding into the field of view of the camera's lens. As cameras get smaller in size, a demonstratable trend in recent years, the probability that the operator's finger may cover the taking lens increases.

SUMMARY OF THE INVENTION

Accordingly, an object of the present invention is the provision of a mechanism for preventing operation of a camera and/or for alerting the operator if the operator's finger is protruding into the camera's field of view.

In accordance with a preferred embodiment of the present invention, a lens cover, which is movable between a lens-covering and an open position, has a portion which extends from the camera housing adjacent to the camera's field of view such that the operator's finger, extending into the field of view, would engage the portion of the lens cover. The cover is movable against the bias of a spring into the path of the shutter release button so that if the extending portion is contacted by the operator's finger, the cover will move into a shutter release button blocking position, thereby preventing operation of the camera.

The camera may also be provided with a flag or other member interconnected with the lens cover so that depression of the cover by the operator's finger causes the flag to move into the viewfinder, thereby alerting the operator to the situation.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because cameras are well known, the present description is directed in particular to elements forming a part of or cooperating directly with, apparatus in accordance with the present invention. It is to be understood that camera elements not specifically shown or described may take various forms well known to those skilled in the art. Although the illustrated embodiments are still cameras it will be understood that the present invention is equally applicable to motion picture cameras.

Figure 1:
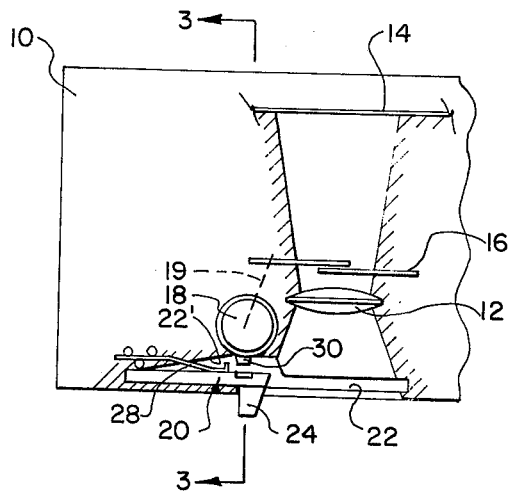
FIG. 1 is a schematic top view of a portion of a camera in accordance with the present invention.
Figure 3:
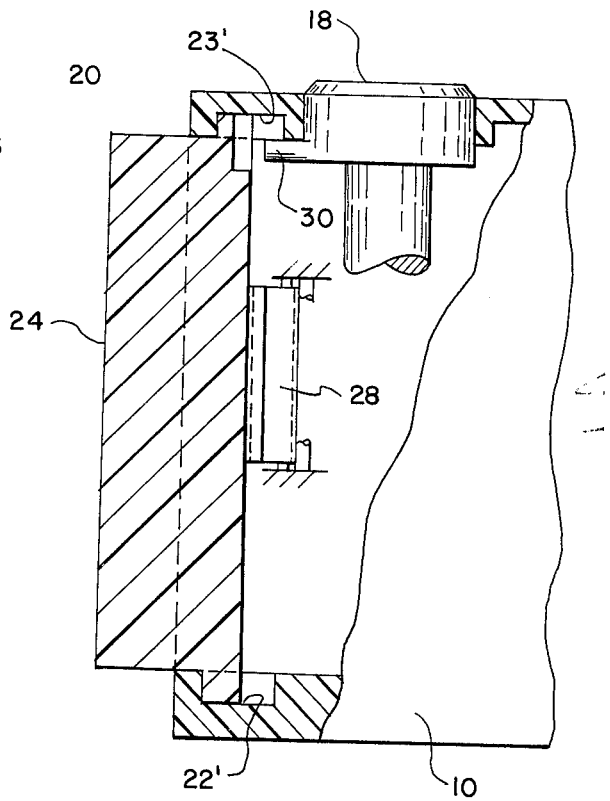
FIG. 3 is a sectional view taken along line 3—3 in FIG. 1.

Referring to FIG. 1, the illustrated camera has a housing 10 in which a lens system, represented by element 12, is mounted. When a shutter mechanism 16 is opened, the lens system forms an image of objects in its field of view on the image area of film 14 receivable in a camera.

A shutter release button, or trigger means, 18 is operatively connected to shutter mechanism 16 in a known manner by dashed line 19) so that depression of the release button operates the shutter to effect exposure of the film.

A lens cover 20 is slidably carried in opposed notches 22 and 23, respectively. The cover is manually slidable, by a portion 24 which extends beyond housing 10, between a closed position covering lens 12 and an opened position. In the drawings, the lens cover is shown opened.

In the opened position, cover 20 is in enlarged portions 22' and 23', of notches 22 and 23 and is held forward by a leaf spring 28. Shutter release button 18 can be depressed to make an exposure.

Figure 2:
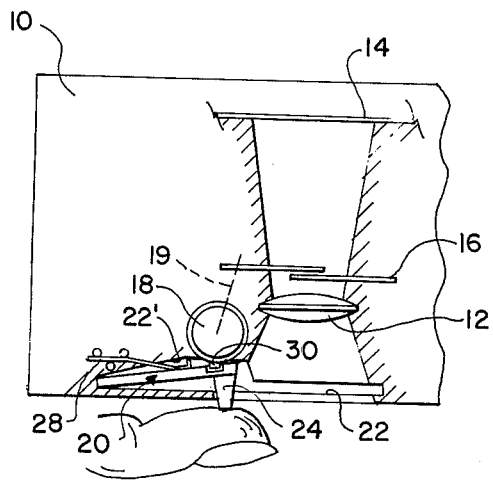
FIG. 2 is a view similar to FIG. 1 showing the operator's finger in the field of view of the camera's optical system.

Referring now to FIG. 2, it is seen that the operator's finger may, if he is inattentive, extend into the field of view of the taking lens. Should a picture then be taken, it will be ruined by the presence of the operator's finger. However, it will be noted that in FIG. 2, the operator's finger has moved into engagement with portion 24 of cover 20, pushing the cover rearwardly in cavities 22' and 23' until a portion of the cover underlies a tab 30 on shutter release button 18. In that position, the cover prevents depression of the shutter release button so that the operator cannot take a picture which would be ruined by the presence of his finger.

Figure 4:
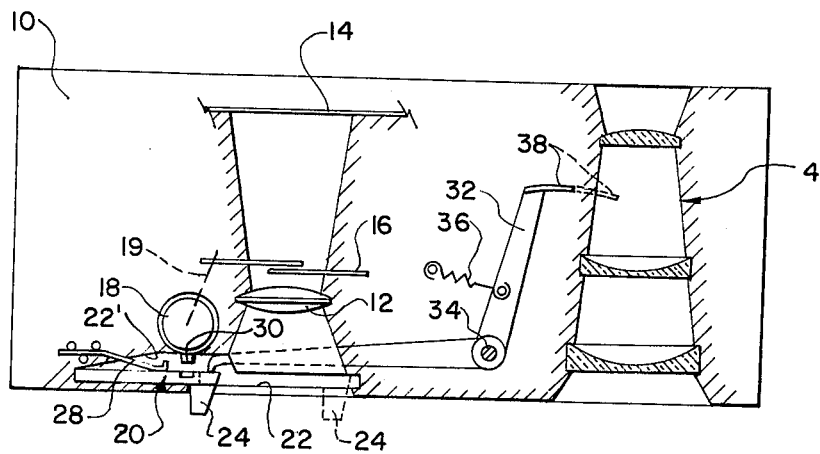
FIG. 4 is a schematic top view of a portion of a camera in accordance with a second embodiment to the present invention.

In another embodiment shown in FIG. 4, I have provided a mechanism for alerting the operator to the presence of his finger in the camera's field of view before he acts to take a picture. It will be recognized that in some photography situations, subjects are fleeting and that if the operator does not take a picture of these subjects when the opportunity arises, the picture-taking opportunity will be lost. Therefore, it is desirable to alert the operator to the fact that something is wrong before he acts to take the picture, rather than waiting until he attempts to depress the shutter release button.

In the embodiment of FIG. 4, when the operator's finger contacts portion 24, and thereby moves cover 20 rearwardly in cavities 22' and 23' to underlie tab 30 of shutter release button 18, the movement of the cover causes a lever 32 to rotate in a clockwise direction about a pivot pin 34 and against the force of a spring 36 so that a flag 38 on lever 32 moves into the cavity of a viewfinder 40. Now, when the operator looks into the viewfinder, he immediately sees that there is something wrong and he will accordingly check the operation of the camera.

It will be noted that when cover 20 is open, portion 24 is adjacent only one side of the lens, and that the operator's finger may come into the camera's field of view from above, below or the other side of the lens. It will be understood that in most situations, should an operator's finger protrude into the camera's ray path, it will come from the side of the camera opposite the viewfinder because a finger coming from the other side would be visible in the viewfinder. However, if desired, portion 24 may be constructed to extend entirely or partially around the lens opening to detect the presence of a finger or other foreign object coming into the field of view from any angle.

The invention has been described in detail with particular reference to preferred embodiments thereof, but it will be understood that variations and modifications can be effected within the spirit and scope of the invention.

I claim:

1. In a camera having a taking lens with a field of view, a shutter mechanism, and operable shutter release means for selectively releasing said shutter to effect exposure of film received at the focal plane of said taking lens; the improvement comprising:
    a lens cover movable between an open state uncovering said taking lens and a closed state covering said taking lens;
    an abutment surface on said lens cover, said abutment surface being movable with said lens cover in its open state into and out of the path of said shutter release means for selectively disabling said shutter release means;
    sensing means on said lens cover for detecting the presence of the operator's finger extending into the camera's field of view; and
    means operatively interconnecting said sensing means and said abutment surface for moving said abutment surface into the path of said shutter release means when said sensing means detects the presence of the operator's finger extending into the camera's field of view.

2. The improvement as defined in claim 1 further comprising means, operatively engageable with said lens cover, for visually indicating movement of said abutment surface into the path of said shutter release means.

3. In a camera having a taking lens with a field of view; the improvement comprising:
    a lens cover movable between an open state uncovering said taking lens and a closed state covering said taking lens;
    sensing means on said lens cover for detecting the presence of the operator's finger extending into the camera's field of view when the lens cover is in its open state;
    indicating means having an active condition sensable by the operator and an inactive condition; and
    means operatively interconnecting said sensing means and said indicating means for placing said indicating means in its active condition when said sensing means detects the presence of the operator's finger extending into the camera's field of view.

4. The improvement as defined in claim 3 wherein said indicating means is visually sensable by the operator.

* * * * *